UNITED STATES PATENT OFFICE.

ALEXANDER PARKS, OF MARTINSBURG, WEST VIRGINIA.

PROCESS OF UTILIZING THE WASTE OF DISTILLERIES, &c.

SPECIFICATION forming part of Letters Patent No. 452,949, dated May 26, 1891.

Application filed May 10, 1890. Serial No. 351,320. (No specimens.)

*To all whom it may concern:*

Be it known that I, ALEXANDER PARKS, a citizen of the United States, residing at Martinsburg, in the county of Berkeley and State of West Virginia, have invented certain new and useful Improvements in a Method of Utilizing the Waste of Distilleries, Glucose and Starch Works, &c., and Converting the Same into Fuel, of which the following is a specification.

My invention has relation to a new and useful method or process of utilizing the waste products of distilleries, glucose and starch factories, breweries, and other works producing waste of a similar nature; and it has for its object to provide a simple and inexpensive method for separating the nitrogenous or solid portions of the said waste from its liquid portion and converting said solid portions into a fuel suitable for use in steam-boiler furnaces and for other purposes, as will fully hereinafter appear.

Heretofore, for the want of a cheap and effectual method of utilizing it, the waste of distilleries, breweries, and similar works has been considered a veritable nuisance and has always been a source of expense and trouble to the manufacturer; and it is the object, therefore, of this invention to provide an effectual and comparatively rapid process whereby this heretofore useless waste may be converted into a fuel suitable for burning in the furnaces of the works or factory, thereby effecting a great reduction in the expenses for fuel.

In practicing my method I discharge the hot waste as it comes from the still or other receptacle into a tank or vat or other suitable vessel. In this condition it is very hot and in a liquid form, the solid portions being very finely comminuted and intimately mixed with the liquid portion, and it is therefore necessary to employ some method other than straining or draining or pressing for quickly and effectually separating the liquid from the solid portions. To accomplish this in the most effectual and quickest way and lose the least possible quantity of the solid matter, I permit the same to settle to the bottom of the tank and while this precipitation is taking place run off from the surface the liquid matter. In this way very little of the solid matter is run off, and I am enabled to separate sixty or seventy per cent. of the water, leaving in the bottom of the tank a thick hot semi-liquid mass of nitrogenous material, which is in condition to be carried through the second stage of the process. The semi-liquid mass while hot is run or discharged from the first tank through a trough into another tank or vessel, upon the bottom of which is spread a loose layer of suitable depth of reasonably-fine coal, coke, cinders, sawdust, or other substance of a like combustible nature. The bottom or near the bottom of this tank is slotted or provided with suitable openings, whereby the watery matter drained from the waste material by the said porous layer of fuel (coal, coke, &c.) will be run off or discharged from the tank. In this manner forty or fifty per cent. of the water remaining in the waste after the first separation may be extracted therefrom while the same is still in a hot condition.

The quantity of fuel spread upon the bottom of the tank will of course vary with the exigencies of each case, and may be varied without departing from my invention; but I have found that about a three-inch layer of fuel for a twelve-inch layer of waste answers very well and serves to extract quickly and effectually the free watery matter from the mass. The waste is left in this tank to drain a few hours or until it becomes thoroughly drained, (its condition being shown by the cracks in its surface,) when it is removed, together with the lower stratum of porous fuel, by shoveling or otherwise and thrown upon a slightly-inclined open slatted floor, where it is allowed to remain as long as desirable to further drain. Instead of placing the material upon the inclined slatted floor, it may be taken directly to the boiler-house, as it may be burned, if desired, immediately upon its removal from the draining or second tank.

It will be observed that in removing the waste from the second tank, together with the coal, coke, or other fuel, the two will become thoroughly mixed, and thereby form a fuel of great heating capacity, as experiment has demonstrated. When the fuel thus formed is taken to the boiler-house, it may be mixed, before introduction into the furnace, with additional coal, coke, cinders, or other material of a like nature, if it is found desirable.

The waste as it comes from the draining-tank may be used as fuel without any further treatment; but it is desirable to mix it with a suitable quantity of coal or other fuel before using. This method is particularly adapted for reclaiming the waste of distilleries; but I can see no reason why it cannot be employed with equal advantage for utilizing the waste of glucose and starch works, breweries, and the like.

Having thus fully described my invention, what I claim is—

The method herein described of reclaiming and preparing for use the waste of distilleries, &c., consisting in first separating the liquid and solid matter therein, then discharging the semi-liquid solid matter upon a layer of broken coal, coke, or other fuel, where it is permitted to drain, and finally mixing the drained waste with the porous body of fuel, whereby the waste is converted into fuel, substantially as described.

In testimony whereof I affix my signature in presence of two witnesses.

ALEXANDER PARKS.

Witnesses:
CONRAD CLINE,
C. A. YOUNG.